June 15, 1926. 1,588,456
H. O. HEM
WEIGHING SCALE
Filed July 16, 1925
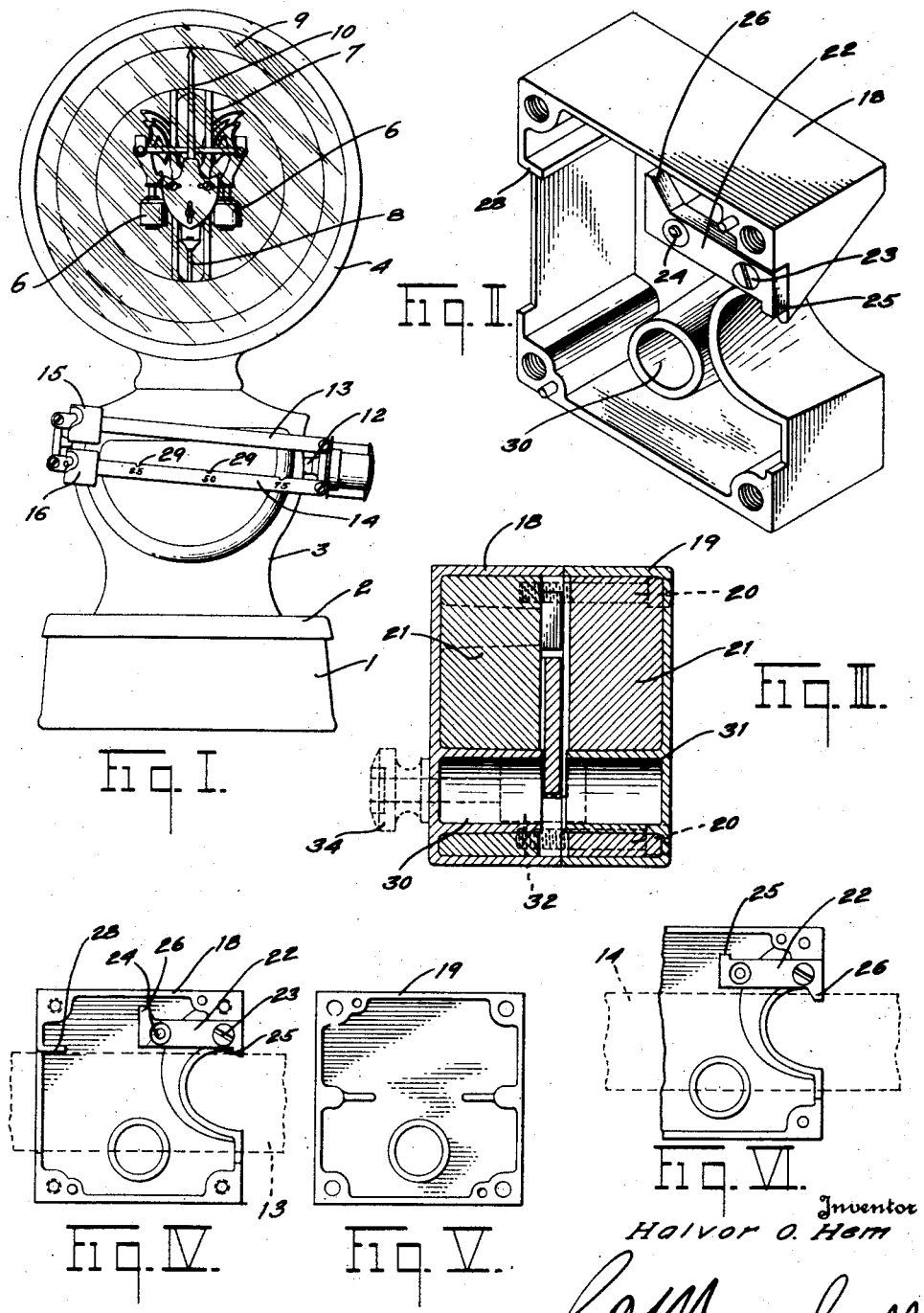
Inventor
Halvor O. Hem
By Geo. O. Marshall
Attorney Patented June 15, 1926.

1,588,456

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed July 16, 1925. Serial No. 43,999.

This invention relates to scales, but more particularly to the construction of a load-counterbalancing element or poise for use on the beams of scales.

One of the principal objects of my invention is the provision of a poise for scales incorporating an adjustable means whereby the poise may be rendered adaptable for use with different types of scale beams.

Another object is the provision of a poise which may be readily sealed to a desired weight without altering or changing the exterior form of the poise.

And still another object is the provision of a poise shell which is particularly adapted to be made by the casting under pressure or die casting method.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevational view of a weighing scale of a well known type embodying my invention;

Figure II is an enlarged isometric perspective view of a portion of the poise of my invention;

Figure III is a sectional view through the poise;

Figure IV is an elevational view showing a portion of the poise and the position of various parts thereof when the poise is adapted for use with a certain type of beam;

Figure V is an elevational view of the other half of said poise; and

Figure VI is a fragmentary view of a part of said poise, illustrating its adaptability for use with another type of scale beam.

Referring to the drawings in detail, I have illustrated my invention as incorporated in a weighing scale of a particular type, but it is to be understood that the scale per se forms no part of the present invention and that I contemplate the use of the device wherever it may be found to be practicable. The scale proper consists of a base 1 containing platform levers (not shown) supporting a load receiving platform 2, and erected upon one end of the base is a column 3 surmounted by a watch-case-shaped housing 4 within which is supported the automatic load-counterbalancing and indicating mechanism. The load-counterbalancing mechanism comprises a pair of pendulums 6 suitably supported upon a frame 7 and connected to a steelyard rod 8 in such a manner that a downward pull on the rod 8 resulting from a load being placed upon the platform 2 will cause the pendulums to move outwardly and upwardly to counterbalance the load, the weight of the load being indicated upon a chart 9 by means of an indicating hand 10 connected by means of suitable rack and pinion mechanism (not shown) to the pendulum mechanism.

The steelyard rod 8 is also connected to an intermediate lever 12 fulcrumed within the column 3 and provided with a pair of beams 13 and 14 which are suitably equipped with poises 15 and 16. The beam 13 is provided with a smooth surface so that the poise 15 may be positioned at any point on the beam. The poise is properly termed a tare poise because it is used principally for offsetting the weights of containers when net weights of the contents of such containers are desired. The beam 14, however, is provided with a series of spaced notches 29 which are adapted to properly position the poise 16 on the beam, each notch representing a certain designated increment in the weighing capacity of the scale. As the beams are of slightly different construction, it is usually necessary to construct two different types of poises for use with these beams. It is, however, one of the salient features of my invention to provide one type of poise which may, with slight change, be rendered suitable for use on both smooth and notched beams. The poise per se consists of a pair of substantially rectangular hollow shells 18 and 19 adapted to coincide with each other to form a hollow rectangular box-like structure, the respective parts being held together by means of screws 20. The poise may be sealed to the desired weight by introducing lead 21 or other material into the shells 18 and 19 of the poise, as particularly shown in Figure III. The vertical walls of the shell 18 are notched or cut away to admit the beam 18, and fixed to the shell by means of a screw 23 and a dowel 24 is a pawl 22 provided with oppositely projecting fingers 25 and 26. When the poise is to be used as a tare poise and operated in conjunction with the plain beam 12 the pawl 22 is positioned as illustrated in Figure IV, with the finger 25 engaging the edge of the beam. The poise shell 18 is formed with a comparatively small ledge 28, which, with the finger 25, are the only parts of the poise in engagement with the beam, so that the effort required to manipulate the poise is reduced to a minimum. When the poise is operated in conjunction with a notched beam for the purpose of increasing the normal capacity of the scale the relative position of the pawl 22 in the poise shell 18 is reversed, as clearly illustrated in Figure VI, with the tapered finger 26 engaging the edge of the beam 14. The shape of the finger 26 is such as to engage the notches 29 to accurately position the poise. A slight vertical movement of the poise disengages the finger 26 from the notch, and the poise may with little effort be moved to another notch. The pawl 22 is hardened sufficiently to prevent excessive wear on the fingers due to the sliding engagement with the beams.

It will be apparent from the foregoing description that only one type of poise may, by slightly altering or reversing the position of the pawl 22, be employed either as a tare or a capacity poise. This construction makes it possible to decrease the cost of manufacturing, as one set of patterns, tools and fixtures will suffice for both kinds of poises, and the necessity of carrying two different types of poises in stock is also obviated.

If it is found desirable to temporarily secure the poise in an adjusted position, a lock may be provided, as illustrated in dotted lines in Figure III. The poise shells 18 and 19 are, therefore, formed with cylindrical portions 30 and 31 adapted to receive a substantially cylindrical member 32 having a slot adapted to receive the beam and a threaded tenon which projects through an opening in the wall of the poise shell 18. The tenon is provided with a thumb nut 34 which may be rotated to bring the cylindrical member 32 into frictional engagement with the beam and thus prevent further relative movement of the poise.

The embodiment of my invention herein shown and described is to be regarded as illustrative only, and it is to be understood that the invention is susceptible to variation, modification and change within the spirit and scope of the subjoined claims.

Having described my invention, I claim:

1. In a poise for scales, a metallic casing, and means in said casing including a plurality of reversible pawls adapted to successively co-operate with various types of scale beams.

2. In a device of the class described, in combination, a beam, a metallic casing adapted to traverse said beam, and reversible means on said casing adapted to engage and co-operate with said beam.

3. In a poise for scale beams, a metallic casing, a metallic filling of comparatively great density in said casing, a pawl removably fixed to said casing and adapted to engage a scale beam, and means whereby said pawl may be adjusted to selectively bring one of several faces thereof into engagement with said beam.

4. In a poise for scale beams, a metallic casing, a flange on said casing, a reversible pawl having a plurality of projections removably secured to said casing, and means whereby one of the projections on said pawl and said flange are adapted to engage a scale beam.

5. In a poise for scale beams, a pair of similarly formed metallic casings, means for securing said casings together, one of said casings having an opening adapted to receive a scale beam, and means including a reversible pawl secured to one of said casings and adapted to engage a scale beam to provide minimum bearing surface with said beam.

6. In a poise for scales, a plurality of metallic casings, means for properly positioning said casings relative to each other, means for securing said casings together, one of said casings having an opening adapted to receive a scale beam, a reversible pawl secured to one of said casings and adapted for engagement with a scale beam, and means for locking said poise to the beam in adjusted position.

7. In a poise for scale beams, a pair of similarly formed metallic casings, means for securing said casings together, means for properly positioning said casings relative to each other, one of said casings having openings adapted to receive a scale beam, and a reversible member secured to one of said casings having a plurality of projections adapted to be successively brought into position for engagement with several types of beams.

HALVOR O. HEM.